US010853208B2

(12) United States Patent
LeCrone et al.

(10) Patent No.: US 10,853,208 B2
(45) Date of Patent: Dec. 1, 2020

(54) TRANSFERRING A WRITABLE DATA SET TO A CLOUD SERVICE THAT IS SEPARATE FROM THE WRITABLE DATA SET AND TERMINATE A SNAPSHOT AFTER TRANSFER

(71) Applicant: EMC IP Holding Company LLC, Hopkinton, MA (US)

(72) Inventors: Douglas E. LeCrone, Hopkinton, MA (US); Bruce A. Pocock, Hoschton, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/215,971

(22) Filed: Dec. 11, 2018

(65) Prior Publication Data
US 2020/0183801 A1 Jun. 11, 2020

(51) Int. Cl.
*G06F 11/20* (2006.01)
*G06F 3/06* (2006.01)
*G06F 12/16* (2006.01)
*G06F 12/00* (2006.01)

(52) U.S. Cl.
CPC .......... *G06F 11/2082* (2013.01); *G06F 3/064* (2013.01); *G06F 3/065* (2013.01); *G06F 3/067* (2013.01); *G06F 3/0607* (2013.01); *G06F 3/0617* (2013.01); *G06F 3/0644* (2013.01); *G06F 12/00* (2013.01); *G06F 12/16* (2013.01); *G06F 2201/84* (2013.01)

(58) Field of Classification Search
CPC ......... G06F 12/00; G06F 12/16; G06F 11/082
See application file for complete search history.

(56) References Cited

U.S. PATENT DOCUMENTS

| 7,249,130 | B2  |   | 7/2007  | Vishlitzky et al. |
|-----------|-----|---|---------|-------------------|
| 9,503,542 | B1  | * | 11/2016 | Wang ............... H04L 67/06 |
| 9,588,977 | B1  | * | 3/2017  | Wang ............... G06F 16/13 |
| 10,534,750| B1  | * | 1/2020  | Sarda ............... G06F 16/128 |
| 10,545,987| B2  | * | 1/2020  | Borowiec .......... G06F 16/27 |
| 10,656,876| B1  | * | 5/2020  | Guturi ............. G06F 3/0619 |

(Continued)

OTHER PUBLICATIONS

Cathy Cronin, IBM System z10 I/O and High Performance Ficon for System z Channel Performance, Technical paper, IBM Corporation, Jan. 28, 2009, 33 pp.

Primary Examiner — Tammara R Peyton
(74) Attorney, Agent, or Firm — Muirhead and Saturnelli, LLC

(57) ABSTRACT

Transferring data from a storage device to cloud service includes initiating a snapshot of the data, accessing each block of the data corresponding to the snapshot to transfer each block to the cloud service, and terminating the snapshot after all of the blocks have been transferred to the cloud service. At least some blocks of the storage device that are modified after initiating the snapshot may be copied from the storage device to a storage pool prior to modification. Only a first modification of a particular one of the blocks of the storage device may cause the particular one of the blocks to be copied to the storage pool. Accessing each block of the data may include accessing blocks of the storage pool. Modifying a particular one of the blocks of the storage device may include modifying a corresponding block of a storage pool.

18 Claims, 6 Drawing Sheets

(56) References Cited

U.S. PATENT DOCUMENTS

2012/0079221 A1* 3/2012 Sivasubramanian ........................ G06F 11/1456 711/162
2018/0267985 A1* 9/2018 Badey ................... G06F 16/128
2019/0220527 A1* 7/2019 Sarda ....................... G06F 3/067
2019/0339873 A1* 11/2019 Mainali ................... G06F 3/067

* cited by examiner

TRANSFERRING A WRITABLE DATA SET TO A CLOUD SERVICE THAT IS SEPARATE FROM THE WRITABLE DATA SET AND TERMINATE A SNAPSHOT AFTER TRANSFER

TECHNICAL FIELD

This application relates to the field of computer systems and storage devices therefor and, more particularly, to the field of storage access and I/O operations for data being transferred to a cloud service.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to any one of the actual disk drives. Allowing multiple host systems to access the single storage device unit allows the host systems to share data stored therein.

In some cases, it is desirable to use a cloud service to store and retrieve data. Cloud services generally provide on-demand service, broad network access, resource pooling, and rapid elasticity or expansion, and thus may be beneficial for many storage applications. However, transferring a data set from a storage device to a cloud service may require that the source data set not be modified at the storage device during the transfer process if it is desirable to maintain data integrity of the resulting replica of the data set at the cloud service. For example, if a data set includes the blocks A, B, and C at the time that a transfer to a cloud service is initiated, and the data set is modified after block A has been transferred but before block C has been transferred to become A', B, and C', then the data set at the cloud service will become A, B, and C', which is inconsistent because it contains A and C' together rather than A and C or A' and C'.

One way to address this issue is to prevent modification of a data set while the data set is being transferred to a cloud service. Thus, in the example above, A, B, C would be transferred to the cloud service prior to writing to the data set. While this solution may address issues of data inconsistency of data transferred to a cloud service, it requires preventing modification of a data set while data is being transferred to the cloud service. In some instances, this may be unacceptable, especially in cases where it takes a significant amount of time to transfer the data set to the cloud service.

Accordingly, it is desirable to be able to modify a data set while the data set is being transferred to a cloud service in a manner that maintains integrity of the resultant replica data set at the cloud service.

SUMMARY OF THE INVENTION

According to the system described herein, transferring data from a storage device to cloud service includes initiating a snapshot of the data, accessing each block of the data corresponding to the snapshot to transfer each block to the cloud service, and terminating the snapshot after all of the blocks have been transferred to the cloud service. At least some blocks of the storage device that are modified after initiating the snapshot may be copied from the storage device to a storage pool prior to modification. Only a first modification of a particular one of the blocks of the storage device may cause the particular one of the blocks to be copied to the storage pool. Accessing each block of the data may include accessing blocks of the storage pool. Modifying a particular one of the blocks of the storage device may include modifying a corresponding block of a storage pool. Accessing each block of the data may include accessing only blocks on the storage device. Prior to initiating the snapshot, modifications directed toward the storage device may cause blocks of the storage device to be modified. Following terminating the snapshot, modifications directed toward the storage device may cause blocks of the storage device to be modified. The cloud service may be provided by cloud storage. The cloud storage may be publicly available.

According further to the system described herein, a non-transitory computer readable medium contains software that transfers data from a storage device to cloud service. The software includes executable code that initiates a snapshot of the data, executable code that accesses each block of the data corresponding to the snapshot to transfer each block to the cloud service, and executable code that terminates the snapshot after all of the blocks have been transferred to the cloud service. At least some blocks of the storage device that are modified after initiating the snapshot may be copied from the storage device to a storage pool prior to modification. Only a first modification of a particular one of the blocks of the storage device may cause the particular one of the blocks to be copied to the storage pool. Accessing each block of the data may include accessing blocks of the storage pool. Modifying a particular one of the blocks of the storage device may include modifying a corresponding block of a storage pool. Accessing each block of the data may include accessing only blocks on the storage device. Prior to initiating the snapshot, modifications directed toward the storage device may cause blocks of the storage device to be modified. Following terminating the snapshot, modifications directed toward the storage device may cause blocks of the storage device to be modified. The cloud service may be provided by cloud storage. The cloud storage may be publicly available.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
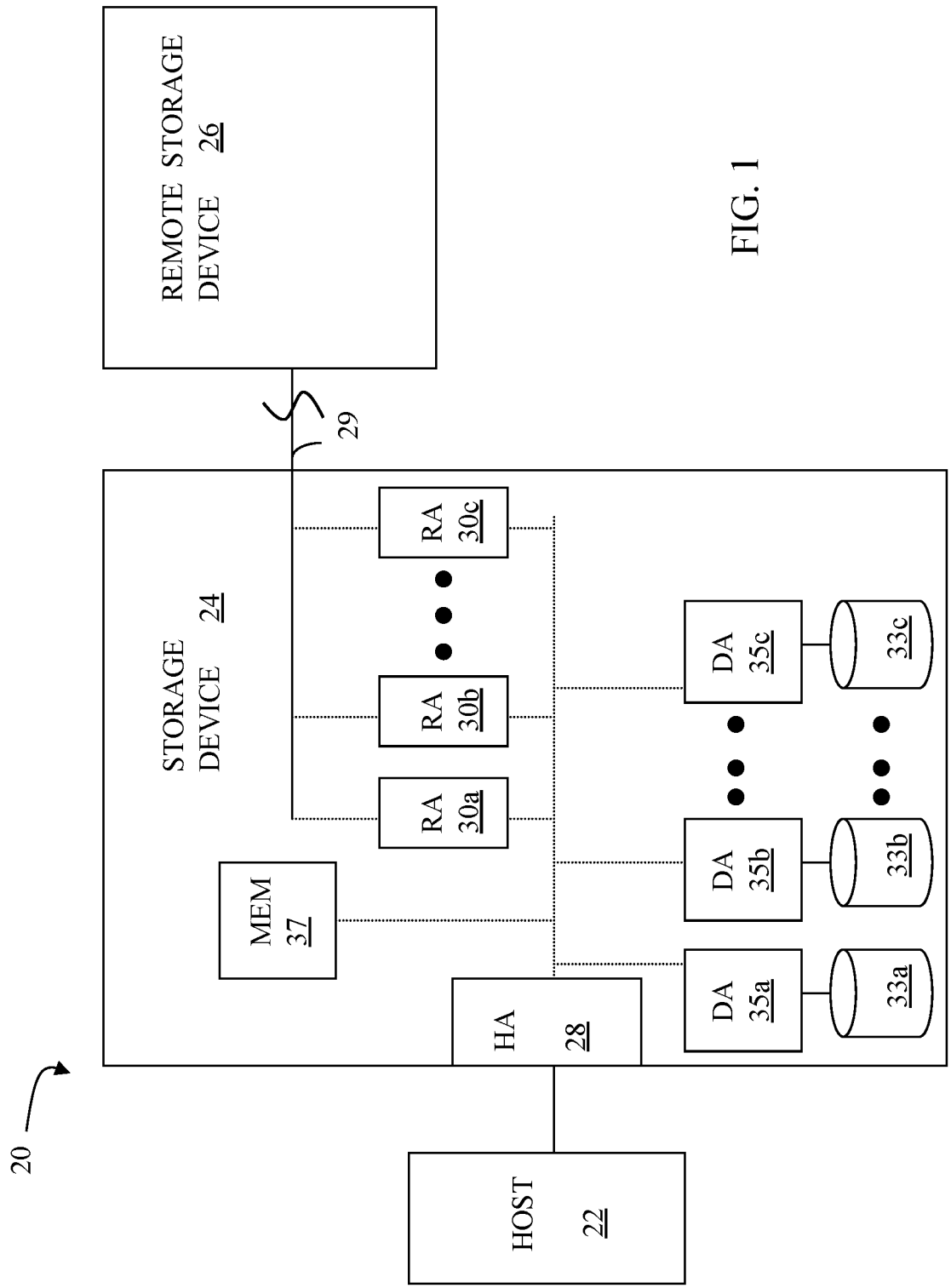
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. The host 22 may be a computer running Linux, z/OS or some other appropriate operating system. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more disks (including solid state storage), each containing a different portion of data stored on each of the storage device 24. FIG. 1 shows the storage device 24 having a plurality of disks 33a, 33b, 33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the HA 28 and the RA's 30a-30c of the storage device 24. Note that, in other embodiments, it is possible for more than one disk to be serviced by a DA and that it is possible for more than one DA to service a disk. The storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and/or the RA's 30a-30c, and may contain a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 may be subdivided into a plurality of volumes or logical devices, where each of the logical devices may or may not correspond to one or more disks of the remote storage device 26.

Figure 2:
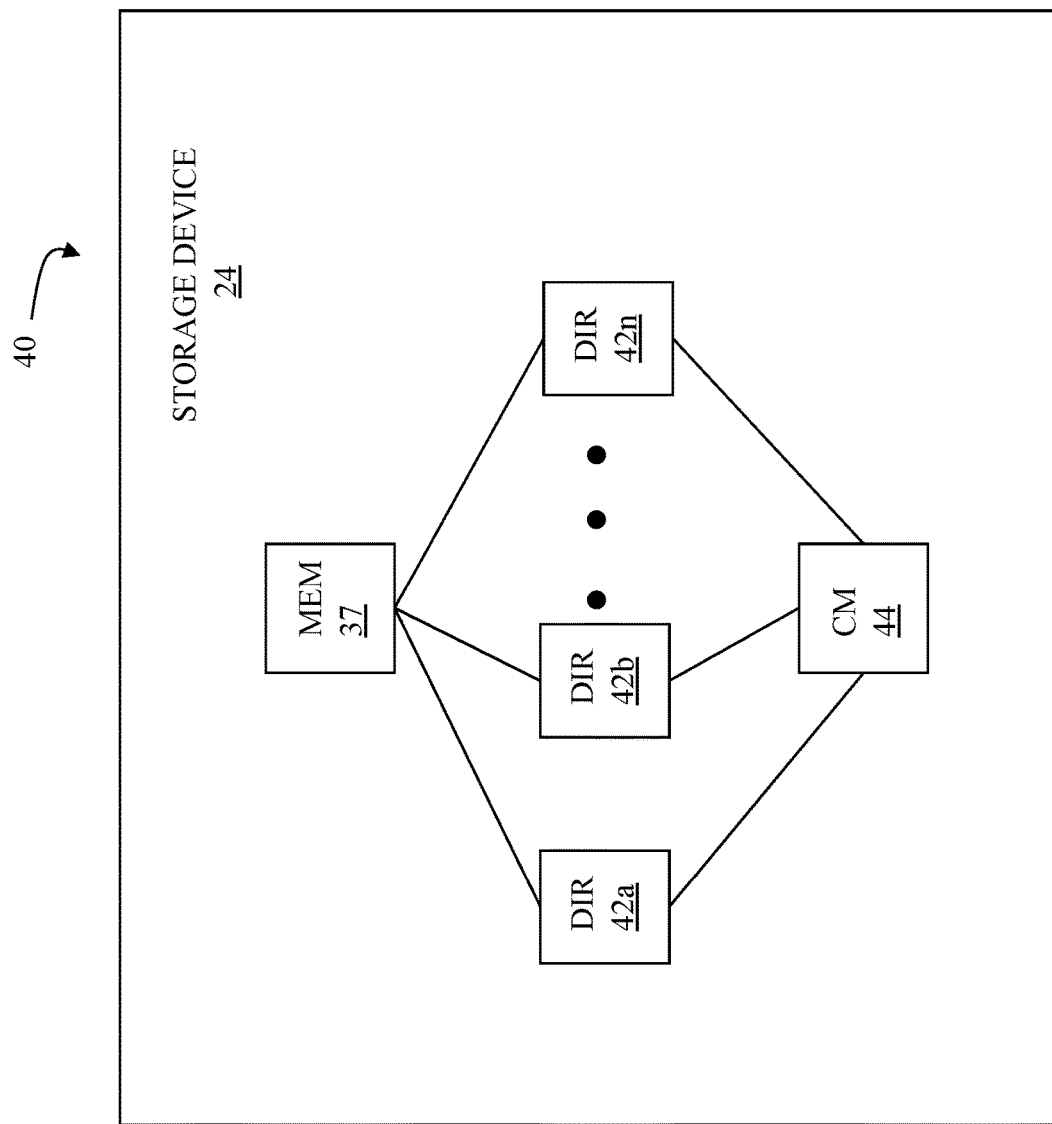
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system.

In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Figure 3:
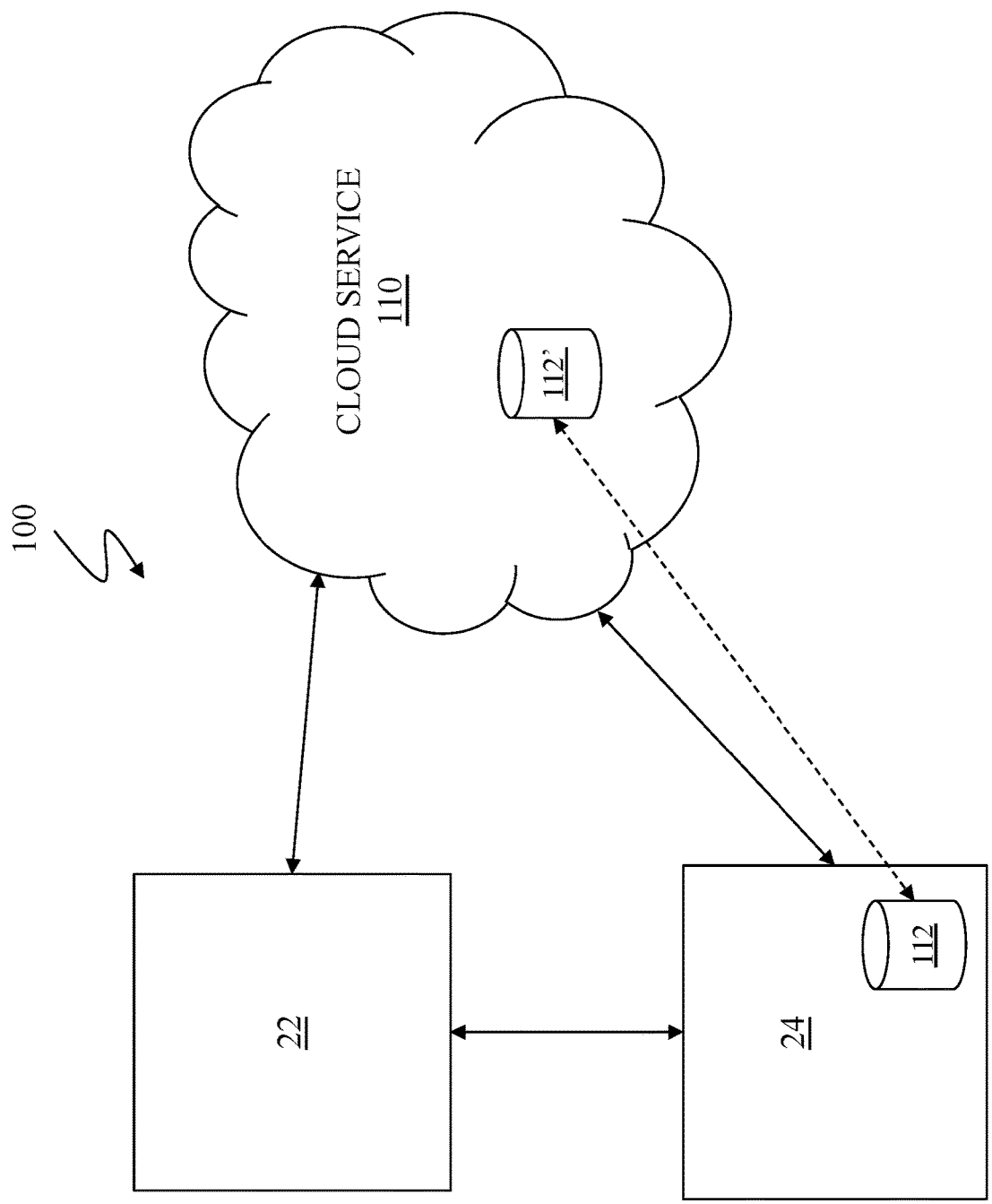
FIG. 3 is a schematic illustration showing a system with a host, a data storage device, and a cloud service according to an embodiment of the system described herein.

FIG. 3 is a schematic illustration showing a system 100 with the host 22 and the data storage device 24 coupled to a cloud service 110. The cloud service 110 may be coupled to the storage device 24 using, for example, a conventional TCP/IP connection therebetween, although other types of connections may be used. In some instances, the cloud service 110 may also exchange data (e.g., control/status information) with the host 22 using, for example, a TCP/IP connection. In other embodiments, the host 22 does not communicate directly with the cloud service 110. The cloud service 110 may be a public commercially-available cloud storage, such as the AWS cloud computing system provided by Amazon, the IBM Cloud, etc. The cloud service 110 could also be implemented with one or more private cloud services by an organization for use by members only. The cloud service 110 could also be implemented using a combination of one or more public cloud systems with one or more private cloud systems. Generally, the cloud service 110 provides on-demand service, broad network access, resource pooling, and rapid elasticity or expansion.

The connection mechanism between the host 22 and the data storage device 24 may include an Internet connection and/or possibly some other types of connection(s). In an embodiment herein, the connection mechanism may be directly incompatible with a FICON connection on at least one end of the connection and thus may rely on a FICON emulator (and/or other emulator(s)) for providing data in an appropriate format. It is further noted that where FICON emulation is being performed, the data storage device 24 may include or be coupled to a FICON emulator portion that may send and receive data to and from the connection mechanism and also emulates a Fibre Channel FCO physical layer for the benefit of the data storage device 24. Thus, in a case involving emulation, both the host 22 and the data storage device 24 may operate as if the devices 22, 24 were communicating directly using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol. zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

It is possible to transfer a data set 112 (e.g., a volume, a range of extents, etc.) to provide a copied data set 112' at the cloud service 110. Conventionally, it is not acceptable to modify the data set 112 while data is being replicated to the cloud service 110 because doing so would make the copied data set 112' inconsistent. However, in the system described herein, it is possible for the host 22 to modify the data set 112 (i.e., write data to the data set 112) on the storage device 24 while data is being replicated from the data set 112 to the copied data set 112'. In an embodiment herein, a version of the data set 112 that is replicated to the copied data set 112' corresponds to a version of the data set 112 at a time prior to when the replication operation is initiated. That is, if replication is initiated at a time T, and, during replication the host 22 writes data to the data set 112, the copied data set 112' will correspond to a state of the data set 112 before the time T, irrespective of whatever data was written by the host 22 to the data set 112 after the time T. This is explained in more detail elsewhere herein.

Figure 4:
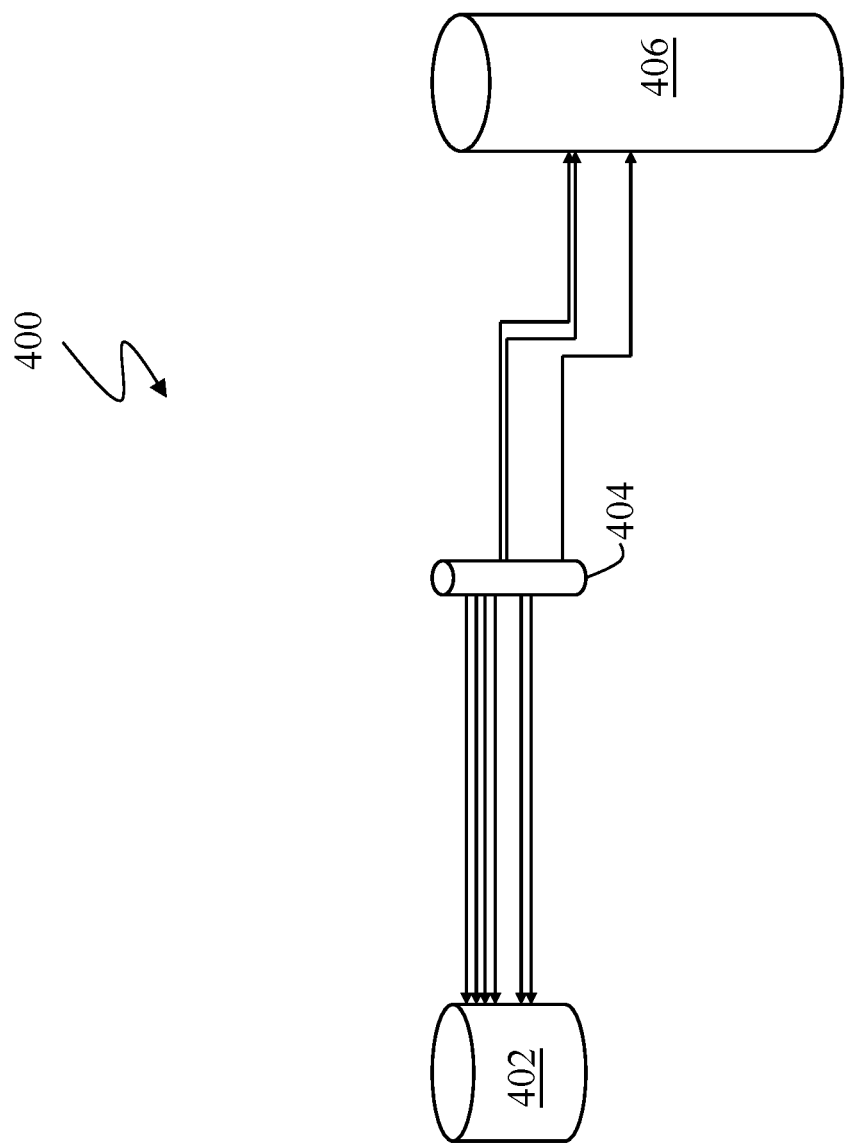
FIG. 4 is a schematic illustration showing a data set, metadata, and a storage pool of a data storage device according to an embodiment of the system described herein.

Referring to FIG. 4, a diagram 400 illustrates data 402 from the data set 112 along with metadata 404 and pool storage 406. Accessing the data set 112 on the storage device 24 is performed using the metadata 404 to determine a location of the data 402. Using metadata to access underlying data on a storage device is generally known. The metadata 404 includes pointers to the data 402 of the data set 112 so that, for example, if the storage device 22 (or another entity) accesses a portion of the data 402 of the data set 112, the storage device 24 first accesses the metadata 404 to determine a storage location (e.g., a physical location on one of the disk drives 33a-33c) of the data 402 being accessed.

The storage pool 406 may include storage space that is not generally accessible by the host 22 or any other external entity. Rather, the storage pool 406 is accessible only by the storage device 24 and is used to facilitate providing a snapshot of the data set 112. In an embodiment herein, all of the pointers of the metadata 404 initially point to only the data 402 for the data set 112. Following initiating a snapshot of the data set 112, the metadata 404 and the storage pool 406 are used to maintain a point in time version of the data set 112 corresponding to the data 402 of the data set 112 at the time of the snapshot. This is described in more detail elsewhere herein and is also described in U.S. Pat. No. 7,249,130 to Vishlitzky, et al., which is incorporated by reference herein.

Figure 5:
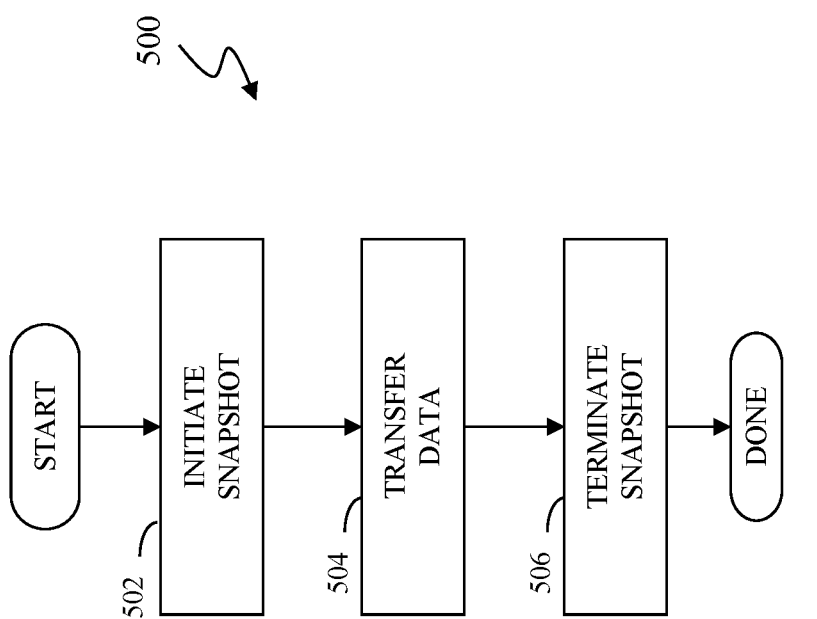
FIG. 5 is a flow diagram illustrating processing performed in connection with a data set being modifiable while being transferred to a cloud service according to an embodiment of the system described herein.

Referring to FIG. 5, a flow diagram 500 illustrates steps performed in connection with replicating the data set 112 to the cloud service 110. Processing begins at a first step 502 where a snapshot is initiated. Initiating the snapshot at the step 502 causes subsequent data writes to the data set 112 by the host 22 (or by another entity) to be handled in a special manner, as described in more detail elsewhere herein. Following the step 502 is a step 504 where data is transferred from the storage device 24 to the cloud service 110. Transferring the data at the step 504 is discussed in more detail elsewhere herein. Following the step 504 is a step 506 where the snapshot is terminated. Following the step 506, processing is complete. Note that, following termination of the snapshot at the step 506, subsequent writes to the data set 112 are not handled in any special manner.

Figure 6:
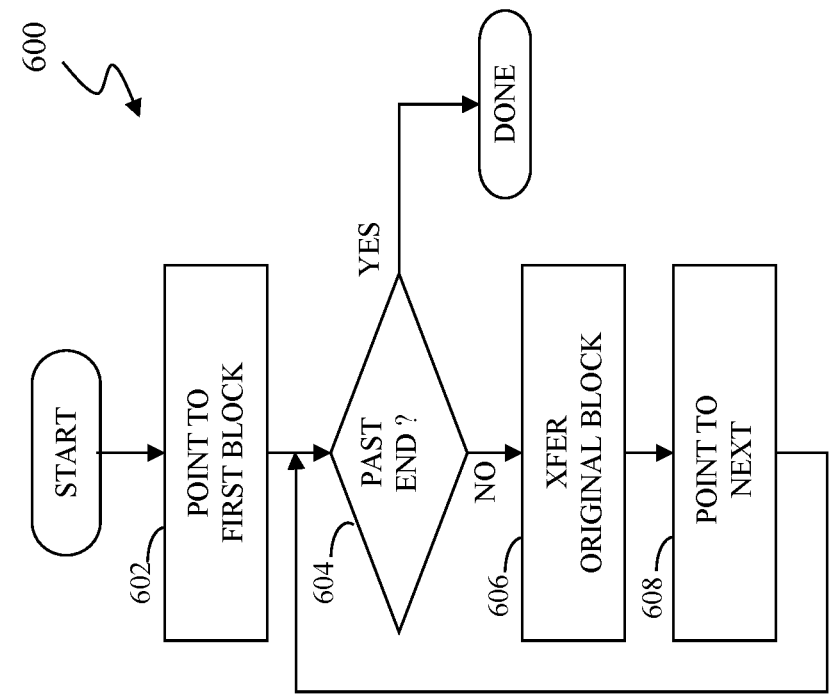
FIG. 6 is a flow diagram illustrating processing performed in connection with transferring modifiable data to a cloud service according to an embodiment of the system described herein.

Referring to FIG. 6, a flow diagram 600 illustrates processing performed in connection with the step 504 of the flow diagram 500, discussed above, where a data set 112 is transferred from the storage device 24 to the cloud service 110. Processing begins at a first step 602 where a pointer that iterates through blocks (sections, portions) of the data of the data set 112 set is initialized to point to the first block.

Following the first step 602 is a test step 604 where it is determined if the iteration pointer points past the end of the data of the data set 112. If so, processing is complete. Otherwise, control transfers from the test step 604 to a step 606 where an original version of a block of the data set 112 is transferred to the cloud service 110. An original version of a block of the data set 112 contains the data 402 that existed at a time that the snapshot was initiated at the step 502, discussed above. Obtaining the original version at the step 606 is discussed in more detail elsewhere herein. Following the step 606 is a step 608 where the pointer that iterates through the blocks is incremented. Following the step 608, control transfers back to the step 604, discussed above, for another iteration.

Figure 7:
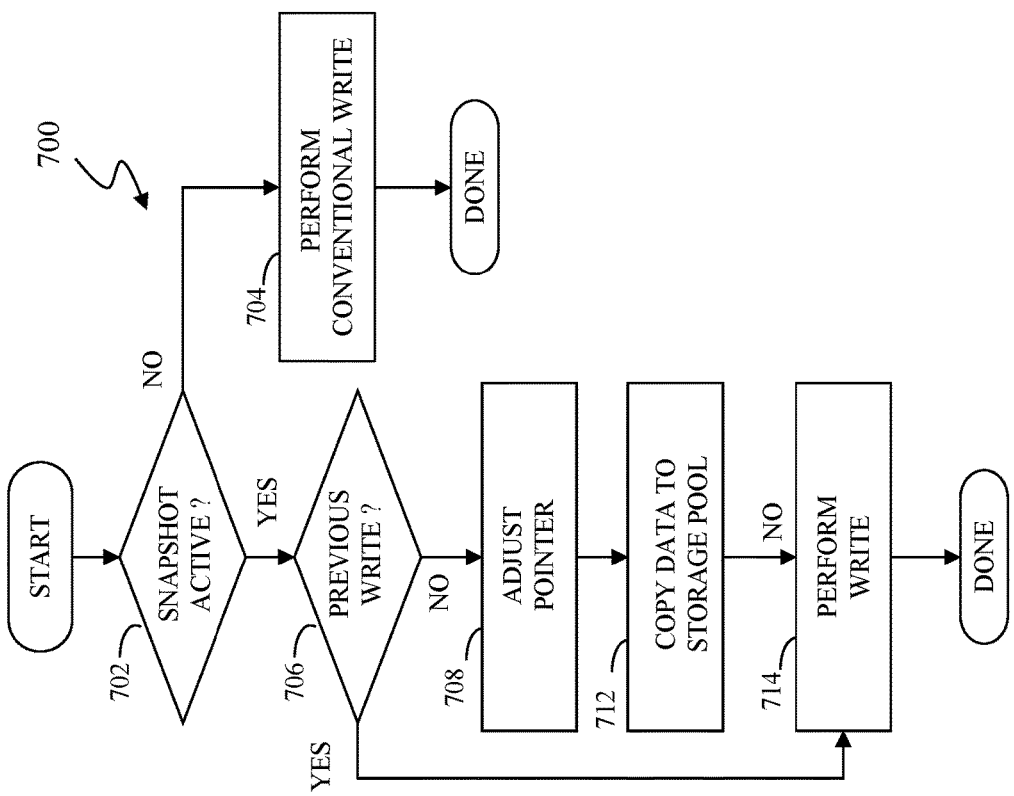
FIG. 7 is a flow diagram illustrating processing performed in connection with handling write operations to a dataset while a snapshot is active according to an embodiment of the system described herein.

Referring to FIG. 7, a flow diagram 700 illustrates processing performed in connection with handling a write to the data set 112 at the storage device 24. The embodiment illustrated by the flow diagram 700 copies portions of the data 402 from the data set 112 to the storage pool 406 and then overwrites the portion of the data 402 in response to a write to the data set 112 after a snapshot is initiated. Processing begins at a first test step 702 where it is determined if a snapshot has been initiated (e.g., at the step 502 of the flow diagram 500, discussed above). If not, then control transfers from the test step 702 to a step 704 where a conventional write operation is performed. Following the step 704, processing is complete.

If it is determined at the test step 702 that a snapshot has been initiated, then control transfers from the test step 702 to a test step 706 where it is determined if a previous write operation has already been performed to the block (section, portion) of the data 402 after initiation of the snapshot. If not, then control transfers from the test step 706 to a step 708 where a pointer in the metadata 404 that points to the block of the data 402 is adjusted to point to a block in the storage pool 406. Following the step 708 is a step 712 where the relevant portion of the data 402 from the data set 112 (i.e., the portion being written) is copied to the block in the data pool 406. Following the step 712 is a step 714 where the data 402 is overwritten with the new data. Note that the step 714 is also reached directly from the test step 706 if it is determined at the test step 706 that a previous write operation has already been performed. Once the original block of the data 402 has been copied to the storage pool 406, subsequent writes to the same block overwrite data at the same block. Following the step 714, processing is complete.

Note that, for the embodiment of FIG. 7, accessing an original version of the data for the data set 112 at the step 606 includes accessing the metadata 404 to determine if an original version of a particular block (portion, section) is either with the data 402 (because no writes were performed following initiating a snapshot) or with the data pool 406 (because at least one write was performed following initiating a snapshot). Thus, a consistent version of the data set 112 is replicated to the cloud service 110 while still allowing writes to be performed to the data set 112.

Figure 8:
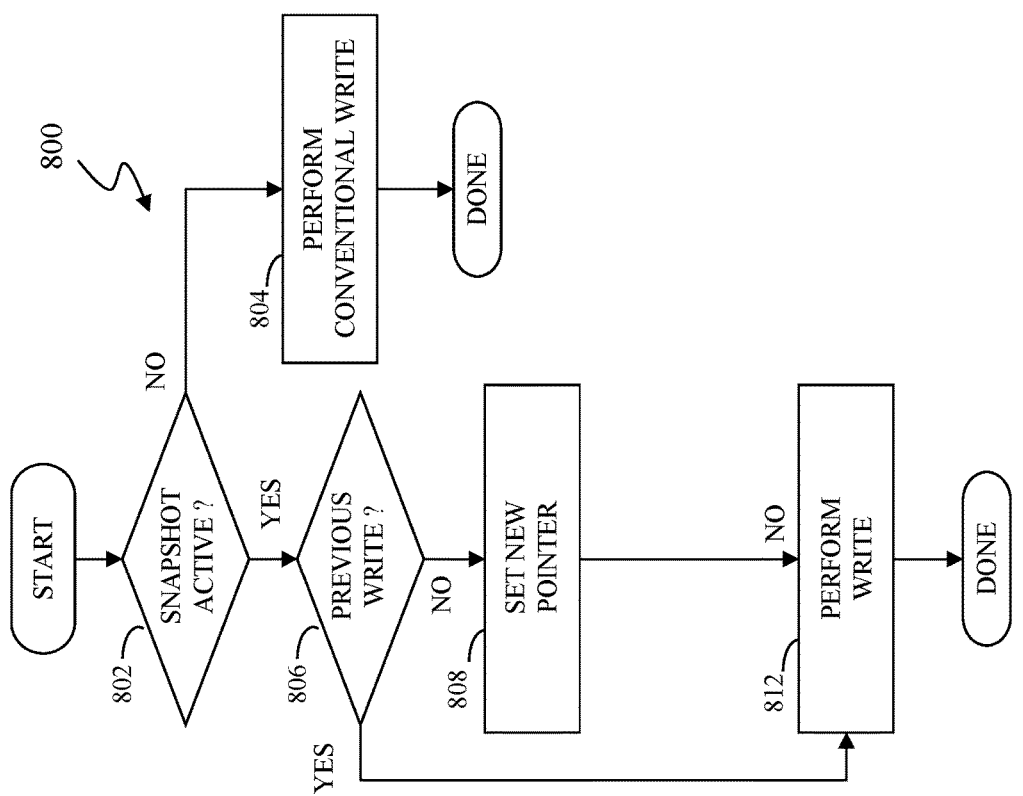
FIG. 8 is a flow diagram illustrating processing performed in connection with handling write operations to a dataset while a snapshot is active according to an alternative embodiment of the system described herein.

Referring to FIG. 8, a flow diagram 800 illustrates an alternative embodiment of processing performed in connection with handling a write to the data set 112 at the storage device 24. The embodiment illustrated by the flow diagram 800 maintains (does not modify) the data 402 from the data set 112 after a snapshot is initiated while data written to the data set 112 after a snapshot is initiated is copied to the storage pool 406. Processing begins at a first test step 802 where it is determined if a snapshot has been initiated (e.g., at the step 502 of the flow diagram 500, discussed above). If not, then control transfers from the test step 802 to a step 804 where a conventional write operation is performed. Following the step 804, processing is complete.

If it is determined at the test step 802 that a snapshot has been initiated, then control transfers from the test step 802 to a test step 806 where it is determined if a previous write operation has already been performed to the block (section, portion) of the data 402 after initiating the snapshot. If not, then control transfers from the test step 806 to a step 808 where a pointer in the metadata 404 is initialized to point to a block in the storage pool 406. Following the step 808 is a step 812 where the data being written is provided to the block in the data pool 406. Note that the step 812 is also reached directly from the test step 806 if it is determined at the test step 806 that a previous write operation has already been performed after initiating the snapshot. After a first write to a particular block, subsequent writes to the same block overwrite data at the block in the storage pool 406. Following the step 812, processing is complete.

Note that, for the embodiment of FIG. 8, accessing an original version of the data for the data set 112 at the step 606 includes accessing only the data 402 because, by design, the data 402 is never modified after a snapshot is initiated. Thus, a consistent version of the data set 112 is replicated to the cloud service 110 while still allowing writes to be performed to the data set 112.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of transferring data from a storage device to cloud service, comprising:
   initiating a snapshot of the data at the storage device;
   maintaining an initial version of each block of the data of the storage device corresponding to each block of the data prior to initiating the snapshot;
   accessing each initial version of each block of the data corresponding to the snapshot to transfer each initial version of each block to the cloud service that is separate from the storage device; and terminating the snapshot at the storage device after all of the blocks have been transferred from the storage device to the cloud service, wherein writes to the initial version of the data are prevented prior to terminating the snapshot at the storage device and wherein at least some blocks of the storage device that are modified after initiating the snapshot are copied from the storage device to a storage pool prior to modification.

2. A method, according to claim 1, wherein only a first modification of a particular one of the blocks of the storage device causes the particular one of the blocks to be copied to the storage pool.

3. A method, according to claim 1, wherein accessing each initial version of each block of the data includes accessing blocks of the storage pool.

4. A method, according to claim 1, wherein modifying a particular one of the blocks of the storage device includes modifying a corresponding block of a storage pool.

5. A method, according to claim 4, wherein accessing each initial version of each block of the data includes accessing only blocks on the storage device.

6. A method, according to claim 1, wherein prior to initiating the snapshot, modifications directed toward the storage device cause blocks of the storage device to be modified.

7. A method, according to claim 1, wherein following terminating the snapshot, modifications directed toward the storage device cause blocks of the storage device to be modified.

8. A method, according to claim 1, wherein the cloud service is provided by cloud storage.

9. A method, according to claim 8, wherein the cloud storage is publicly available.

10. A non-transitory computer readable medium containing software that transfers data from a storage device to cloud service, the software comprising:

executable code that initiates a snapshot of the data at the storage device;

executable code that maintains an initial version of each block of the data of the storage device corresponding to each block of the data prior to initiating the snapshot;

executable code that accesses each initial version of each block of the data corresponding to the snapshot to transfer each initial version of each block to the cloud service that is separate from the storage device; and executable code that terminates the snapshot at the storage device after all of the blocks have been transferred from the storage device to the cloud service, wherein writes to the initial version of the data are prevented prior to terminating the snapshot at the storage device and wherein at least some blocks of the storage device that are modified after initiating the snapshot are copied from the storage device to a storage pool prior to modification.

11. A non-transitory computer readable medium, according to claim 10, wherein only a first modification of a particular one of the blocks of the storage device causes the particular one of the blocks to be copied to the storage pool.

12. A non-transitory computer readable medium, according to claim 10, wherein accessing each initial version of each block of the data includes accessing blocks of the storage pool.

13. A non-transitory computer readable medium, according to claim 1, wherein modifying a particular one of the blocks of the storage device includes modifying a corresponding block of a storage pool.

14. A non-transitory computer readable medium, according to claim 13, wherein accessing each initial version of each block of the data includes accessing only blocks on the storage device.

15. A non-transitory computer readable medium, according to claim 10, wherein prior to initiating the snapshot, modifications directed toward the storage device cause blocks of the storage device to be modified.

16. A non-transitory computer readable medium, according to claim 10, wherein following terminating the snapshot, modifications directed toward the storage device cause blocks of the storage device to be modified.

17. A non-transitory computer readable medium, according to claim 10, wherein the cloud service is provided by cloud storage.

18. A method, according to claim 17, wherein the cloud storage is publicly available.

* * * * *